Sept. 4, 1962 V. J. COATES 3,052,795
RADIATION DISPERSION SYSTEM
Filed March 27, 1959 2 Sheets-Sheet 1

INVENTOR.
VINCENT J. COATES
BY

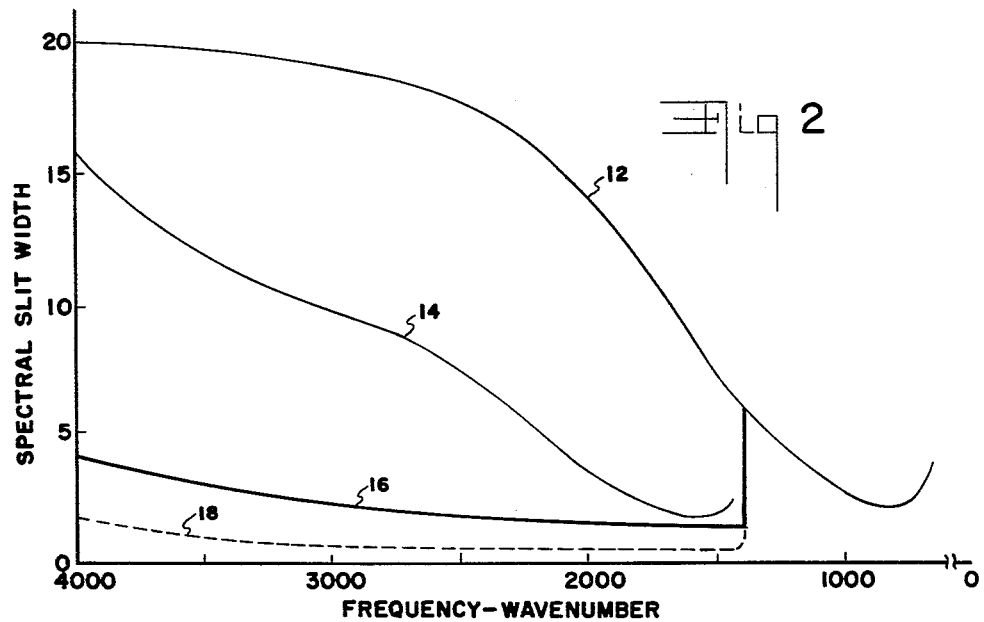
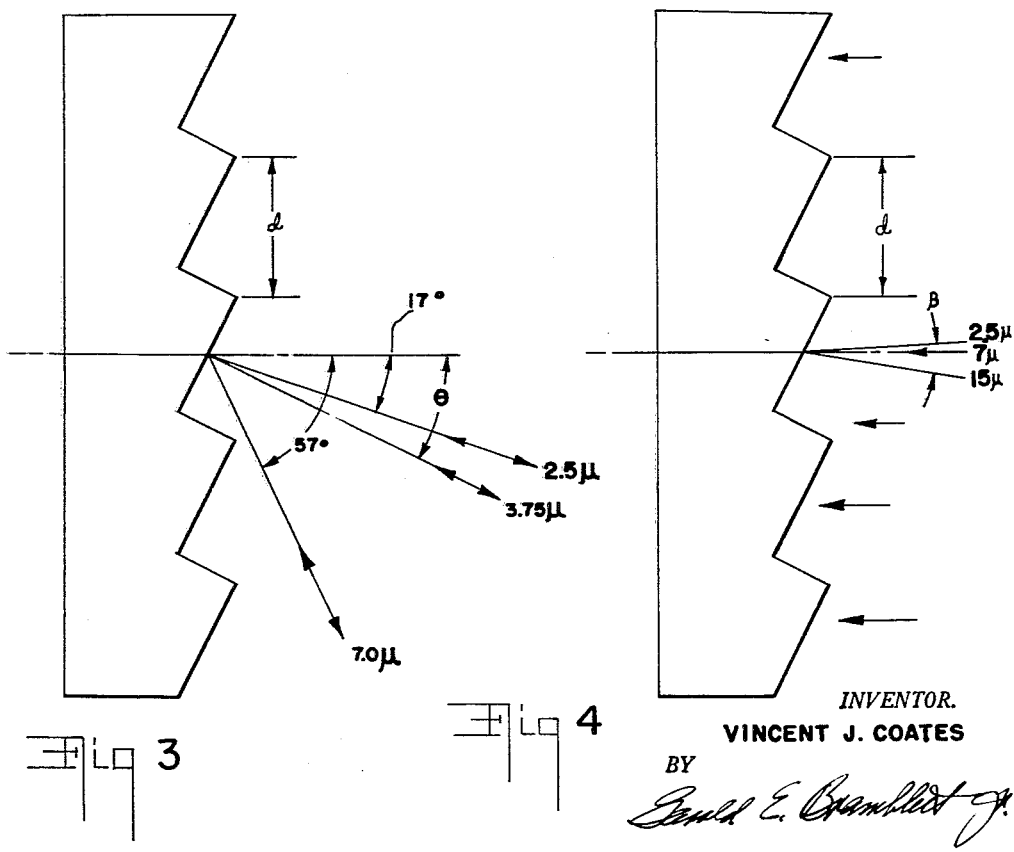

Patent text 3,052,795
RADIATION DISPERSION SYSTEM
Vincent John Coates, Westport, Conn., assignor to The Perkin-Elmer Corporation, Norwalk, Conn., a corporation of New York
Filed Mar. 27, 1959, Ser. No. 802,460
18 Claims. (Cl. 250—43.5)

This invention relates to improved method and apparatus for obtaining spectral dispersion of radiant energy. For a number of years spectrophotometers designed to present absorption data in the ultraviolet, visible, and infrared spectral regions have generally utilized prism monochromators. The most popular prisms, based on the optimum compromises of resolving power and transmission range, have generally been quartz for the ultraviolet, visible, and near infrared regions, and sodium chloride for the fundamental infrared range. As spectrometric techniques have become more perfected, the desire for improved resolving power has increased. Improvement in resolution has been sought through the use of larger prisms, double monochromators, double pass systems, and new optical materials affording higher dispersion but at a sacrifice in wavelength range. Spectroscopists have pointed out that, in the infrared region in particular, instruments incorporating sodium chloride prisms provide spectral slit widths at the higher frequencies (4,000–2,000 cm.$^{-1}$) which exceed in many cases, the natural widths of the absorption bands observed in liquids and solids. In his article entitled, "High Intensities of the Infrared Absorption Bands of n-Paraffin Hydrocarbons," appearing in *Spectrochimica Acta*, volume IX, number 3, 1957, pages 235–251, R. N. Jones has provided an analysis of the effect of spectral slit width on band intensities and has related this to the dispersive properties of various common materials. An analysis of the data appearing in Jones' paper indicates that sodium chloride prisms receiving radiation frequencies between 4,000 and 1,500 cm.$^{-1}$ provide spectral slit widths which introduce major errors in peak intensity data.

It is possible to use other prism materials in this range of frequencies. Lithium fluoride and calcium fluoride prisms have been employed, for example, to obtain narrower spectral slit widths. Monochromators are normally designed to make the interchange of prisms as convenient as possible in order that the optimum prism material may be used for the particular range of frequencies under study. However, it will be apparent that the cost, complexity, and disjointed presentation of data resulting from such interchange leaves much to be desired.

Spectrophotometers have also been designed incorporating grating monochromators. When equipped with suitable means, such as fore-prism monochromators, of eliminating overlapping orders and of switching orders as the spectrum is scanned, grating monochromators often achieve a great improvement in band separation and measurement. Such instruments commonly employ a combination of a prism and a diffraction grating and are known as "grating spectrometers." Instruments of this type produce spectral slit widths of about 3 cm.$^{-1}$ or better over the entire range of 4,000–650 cm.$^{-1}$. The foreprism monochromator usually acts only as a narrow band filter allowing a broad band of wavelengths to enter the grating monochromator. Thus only the grating monochromator provides dispersion of the wavelengths to be measured. Diffraction gratings utilized in this manner offer some promise for improved spectral analysis in chemical spectroscopy. However, along with their advantages, prior art grating spectrometers offer a number of problems—the major problem being an increased complexity resulting in greater cost if convenient operation and optimum spectral data presentation are maintained.

It is, therefore, the primary object of this invention to provide method and apparatus for utilizing the desirable properties of both prisms and gratings through a wide frequency range. Other objects are to achieve such utilization without the necessity of changing components, to maintain suitable efficiency levels, and to reduce instrument complexity.

The above objects are attained by providing a novel method for the separation of radiant energy according to the wavelengths of its components. The method comprises effecting a deviation of the wavelengths of the radiant energy and impinging at least a portion of the deviated radiation wavelengths onto the surface of a diffraction grating having a groove width narrower than the wavelengths of some of the radiation incident thereon and longer than other wavelengths. The grating is then rotated through a diffracting angle relative to some of said wavelengths and through a reflecting angle relative to other of said wavelengths.

The specific manner in which these objects are attained will be apparent from the following description and the figures of the attached drawing wherein:

FIG. 2 is a typical plot of the observed spectral slit widths for sodium chloride and calcium fluoride prisms and for a typical diffraction grating;

FIG. 3 is an enlarged schematic view of radiation falling on a diffraction grating at an angle near its blaze;

FIG. 4 is an enlarged schematic view of radiation falling on the same grating at near-normal incidence.

Figure 1:
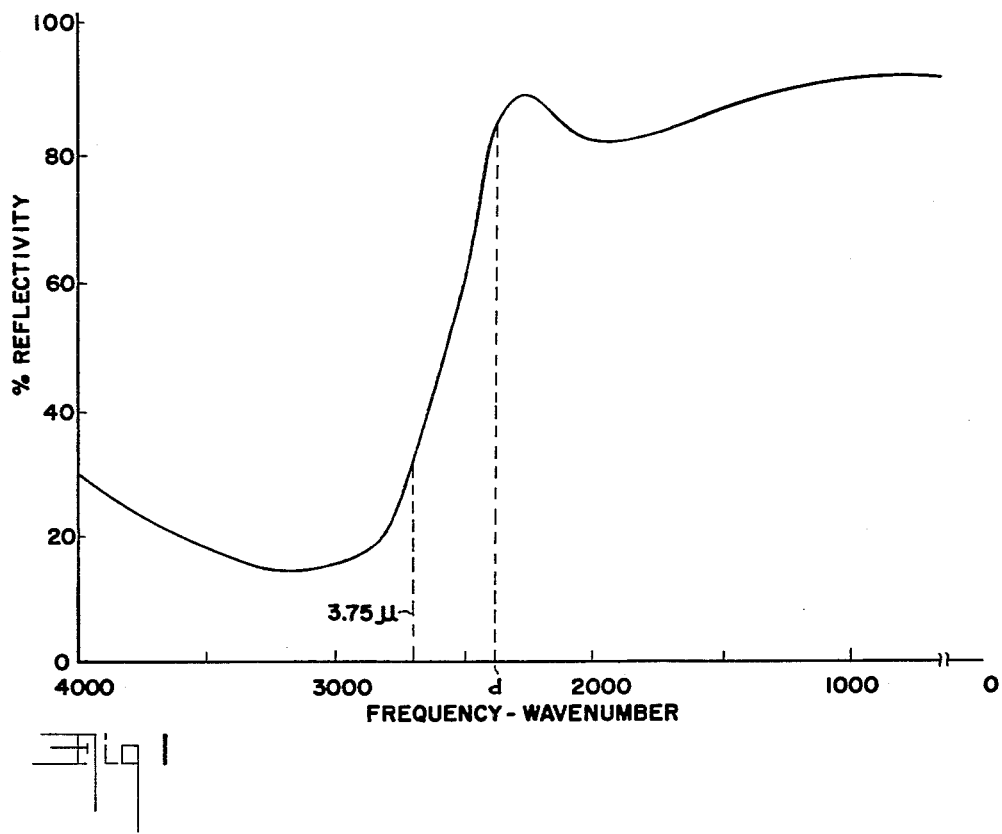
FIG. 1 is a graph of the specular reflectance of infrared radiation striking a grating at near normal incidence plotted against frequency in cm.$^{-1}$.

In one embodiment of this invention, the Littrow mirror of a standard monochromator is replaced with a diffraction grating. Throughout that portion of the infrared spectrum characterized by shorter wavelengths, the angle of the grating is such that it acts as an efficient dispersion means throughout the wavelength region wherein the prism is least efficient. As the wavelengths are scanned, the efficiency of the grating reaches a maximum and begins to decline. The maximum wavelength, reached at grazing incidence, which can be diffracted is twice the groove width. In a well constructed echelette grating blazed at 3.75μ and rotated through a total angle approaching 40° (17° from the normal to 57° from the normal) to achieve a range of approximately 4,000 to 1,400 cm.$^{-1}$, the efficiency of the grating approaches 80% near its blaze angle and drops to approximately 40% at each end of the range. In contrast, the curve of FIG. 1 is a plot of the specular reflectance near normal incidence of such a grating. It can be seen that after a frequency of 2,800 cm.$^{-1}$ is achieved, the specular reflectance rises very rapidly reaching approximately 85% at 2,000 cm.$^{-1}$ and 95% after 1,000 cm.$^{-1}$. This high reflectance is thereafter maintained.

In the same wavelength region wherein the specular reflectance of the grating is increasing with respect to normally incident radiation, the resolving abilities of most commonly used infrared prisms are increasing. The curves of FIG. 2 indicate the degree to which this occurs. In FIG. 2, spectral slit width is plotted against frequency for a sodium chloride prism 12, a calcium fluoride prism 14, a diffraction grating 16, and a combined prism and grating 18. At some wavelength where the diffraction grating has a high specular reflectivity near normal incidence, where the efficiency of the grating has decreased, and where the resolving ability of the prism has increased to an acceptable value, the angle of the grating relative to the radiation leaving the prism is drastically changed. The diffraction grating no longer acts as a dispersing means, but functions in the same manner as the standard Littrow mirror of the common prism monochromator.

An examination of the diffraction process will indicate the reason a grating can act both as an efficient dispersive element near its blaze angle and as a high efficiency mirror near normal incidence. In FIG. 3 a $3.75\mu$ blazed grating is shown with radiation coming to it at an angle near its blaze. Diffracted radiation at angles of from 17° to 57° provides a wavelength range of 2.5 to $7.0\mu$ in the first order. In FIG. 4 the same grating is shown at an angle wherein radiation of all wavelengths strikes at near normal incidence. This is the so-called zero order of the grating. Near the blaze ($3.75\mu$) very little radiation is diffracted into the zero order. However, as the wavelengths become significantly greater than the groove spacing they are reflected at high efficiency in a specular manner. As the wavelength approaches the groove spacing ($d=4.1\mu$), maximum reflectance is reached. The rapid increase in reflectivity for normally incident radiation having a frequency below the blaze frequency (see FIG. 1) can best be explained by reference to the well-known grating equation:

Where $n\lambda = d(\sin i \pm \sin r)$;
$n$ = order number,
$\lambda$ = wavelength,
$d$ = groove width,
$i$ = angle of incident rays,
$r$ = angle of diffracted rays.

When the angle of incidence, $i$, is nearly 0°, the grating equation predicts that the first order wavelength $\lambda$ of the rays diffracted at $r=90°$ is equal to the groove width $d$. Since $r$ cannot exceed 90°, wavelengths greater than the groove width must either be absorbed or reflected by the grating. For an aluminized grating operating in the infrared region, most of the radiation is reflected.

It will be apparent that greatly increased efficiency of dispersion over an extremely broad frequency range may be achieved by the above method. At the shorter wavelengths the grating is used at angles near its blaze angle which provides increased dispersion, in effect the algebraic sum of the dispersions of the prism and the grating. Unwanted grating orders may be eliminated by the use of filters. Then, at a chosen wavelength, the grating is swung to a position of normal incidence where it acts as a simple aluminized mirror. In this condition the monochromator produces dispersion which is strictly that of the prism. It will be apparent that a number of means may be employed for providing the necessary change in angle at the crossover wavelength where the grating changes from a dispersing element to a simple mirror. For example, a simple lever and cam mechanism may be employed.

Figure 5:
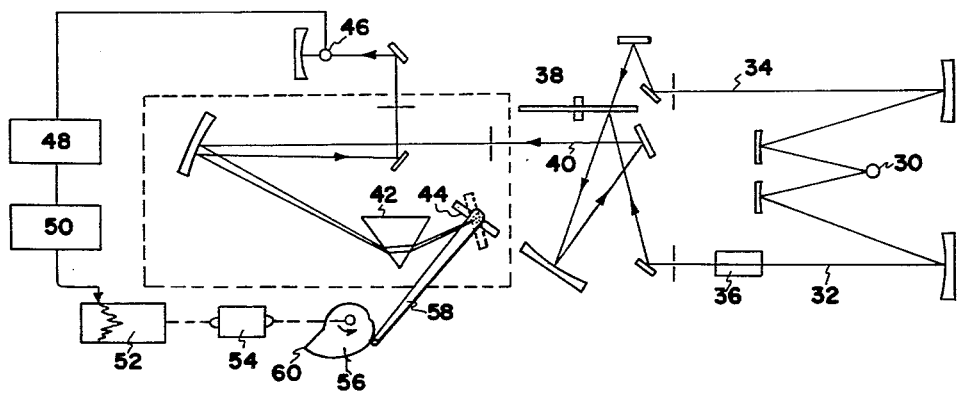
FIG. 5 is an optical schematic of a double beam infrared spectrophotometer utilizing the method and apparatus of this invention.

FIG. 5 is a schematic representation of a spectrophotometer embodying the present invention. A suitable source 30 provides infrared energy which is formed and directed by means of suitable mirror arrangements into a sample beam 32 and a reference beam 34. The sample beam passes through a sample 36 and the two beams are then passed through chopper 38 and combined in conventional double beam manner. The combination beam 40 is then passed through prism 42 where it is partially dispersed. The radiation from prism 42 strikes diffraction grating 44 which is positioned at the location normally occupied by the Littrow mirror of a monochromator but is rotated to a position such that it disperses some of the radiation impinging thereon. At short wavelengths the diffraction grating is maintained at an angle approximating that shown by the solid lines and rotates through the angle required for the dispersion of the incident radiation through the shorter wavelength region of the spectrum. The dispersed radiation is passed through the prism for a second time in the normal manner and is detected by a suitable detector 46. The signal produced by detector 46 is amplified in preamplifier 48 and amplifier 50 to control the pen of recorder drum 52. Motor 54 controls the rotation of drum 52, cam 56, and grating control lever 58. As the analyzed wavelengths approach the cut-over point (indicated in FIG. 2 at approximately 1,400 cm.$^{-1}$, the grating is swung to a new position substantially normal to the incident ray as shown by the dotted line. This is accomplished by forming and pre-positioning cam 56 so that upon rotation in the direction shown it gradually rotates grating 44 in a counterclockwise direction. As point 60 of cam 56 is passed, the grating is swung quickly in a clockwise position almost normal to the incident radiation. Grating 44 is then rotated clockwise and scans as a Littrow mirror. In its new position indicated by the dashed lines, the grating acts solely as a Littrow mirror and only the dispersion of the prism is employed in the analysis.

As an example of the present invention, a 240 grooves per millimeter replica diffraction grating blazed at $3.75\mu$ in the first order with a 54 x 55 mm. ruled area was placed at the Littrow mirror position in a standard Perkin-Elmer double beam infrared spectrophotometer having a sodium chloride prism. Initially, the angle between the normal to the grating surface and the incident ray was approximately 17°, corresponding to $2.5\mu$, and the grating acted as a dispersing element. The grating was rotated to scan through a portion of the spectrum. At an angle of approximately 57° between the normal to the grating surface and the incident ray, corresponding to a wavelength of $7.0\mu$, the grating was rotated at a relatively rapid rate to a new angle of approximately 0° to the $7.0\mu$ radiation from the prism. During this period, the recording functions were momentarily halted. The grating was then utilized as a standard reflecting Littrow mirror with its surface essentially normal in turn to each of the remaining spectral wavelengths. Recordings were made in the $2.7\mu$ and $6.0\mu$ atmospheric water vapor regions and in the $4.3\mu$ atmospheric carbon dioxide region. The results of these analyses were much better than the resolutions obtainable with a standard aluminized Littrow mirror. At longer wavelengths, the results were substantially identical with those obtained using a standard Littrow mirror. With the method of this invention it has been found possible to achieve wide range operation while maintaining excellent resolution throughout the total frequency range. It will be readily apparent to those skilled in the art that the method and apparatus of the present invention provides a great advance in infrared spectrophotometry.

While this invention has been described with particular reference to single-pass double-beam spectrophotometers for the infrared region it is to be understood that it is not so limited. The method of this invention is equally applicable wherever it may be desired to utilize the reflecting qualities of a diffraction grating in combination with a dispersing means. The invention is suitable for use in multi-path instruments, single beam instruments and in any wavelength region including, but not limited to, the visible and ultraviolet regions.

I claim:

1. The method of dispersing radiant energy according to the wavelengths of its components which comprises effecting a deviation of the wavelengths thereof; impinging at least a portion of the deviated radiation wavelengths onto the surface of a diffraction grating having a groove width narrower than the wavelengths of some of the radiation incident thereon and wider than other wavelengths of said radiation; rotating said grating through a diffracting angle relative to some of said wavelengths;

and rotating said grating through a specular reflecting angle relative to other of said wavelengths.

2. The method of dispersing radiant energy according to the wavelengths of its components which comprises effecting a deviation of the wavelengths thereof; impinging at least a portion of the deviated radiation wavelengths onto the surface of a diffraction grating having a groove width narrower than the wavelengths of some of the radiation incident thereon and wider than other wavelengths of said radiation; rotating said grating within a first region through a diffracting angle relative to some of said wavelengths; rotating said grating to a second region; and rotating said grating within said second region through a specular reflecting angle relative to other of said wavelengths.

3. The method of claim 2 wherein said radiant energy is infrared energy.

4. The method of measuring the infrared absorption characteristics of a sample material which comprises passing a beam of infrared energy through said sample; effecting a first separation of the wavelengths of said infrared energy leaving said sample material; impinging at least a portion of the separated radiation wavelengths onto the surface of a diffraction grating having a groove width narrower than the wavelength incident thereon; reflecting said radiation from said diffraction grating in substantially specular form; effecting a second separation of the wavelengths of the radiation so reflected; and measuring the intensity of energy at each of a plurality of wavelengths throughout the radiation spectrum as a measure of said infrared absorption characteristics of said sample material.

5. The method of measuring the infrared absorption characteristics of a sample material which comprises passing a beam of infrared energy through said sample; effecting a first deviation of the wavelengths of said infrared energy leaving said sample material; impinging at least a portion of the deviated radiation wavelengths onto the surface of a diffraction grating having a groove width narrower than the wavelengths incident thereon, said surface being substantially normal to said impinging radiation; reflecting said radiation from said diffraction grating in substantially specular form; effecting a second deviation of the wavelengths of the radiation so reflected; and measuring the intensity of energy at each of a plurality of wavelengths throughout the radiation spectrum as a measure of said infrared absorption characteristics of said sample material.

6. The method of measuring the infrared absorption characteristics of a sample material which comprises passing a beam of infrared energy through said sample; effecting a deviation of the wavelengths of said infrared energy leaving said sample; impinging at least a portion of the deviated radiation wavelengths onto the surface of a diffraction grating having a groove width narrower than some of the wavelengths of the radiation incident thereon and longer than other wavelengths of said radiation; rotating said grating through a diffracting angle relative to the shorter of said wavelengths; and rotating said grating through a specular reflecting angle relative to the longer of said wavelengths.

7. The method of measuring the infrared absorption characteristics of a sample material which comprises passing a beam of infrared energy through said sample; effecting a deviation of the wavelengths of said infrared energy leaving said sample; impinging at least a portion of the deviated radiation wavelengths onto the surface of a diffraction grating having a groove width narrower than some of the wavelengths of the radiation incident thereon and longer than other wavelengths of said radiation; rotating said grating within a first region through a diffracting angle relative to a portion of said wavelengths; rotating said grating to a second region; and rotating said grating within said second region through a specular reflecting angle relative to other of said wavelengths.

8. The method of measuring the infrared absorption characteristics of a sample material which comprises passing a beam of infrared energy through said sample; effecting a first separation of the wavelengths of said infrared energy leaving said sample; impinging at least a portion of the separated radiation wavelengths onto the surface of a diffraction grating having a groove width narrower than some of the wavelengths of the radiation incident thereon and longer than other wavelengths of said radiation; rotating said grating within a first region through a diffracting angle relative to the shorter of said wavelengths; rotating said grating to a second region; rotating said grating within said second region through a specular reflecting angle relative to the longer of said wavelengths; effecting a second separation of the wavelengths of the energy leaving said grating in each of said regions; and measuring the intensity of energy at each of a plurality of wavelengths throughout the infrared spectrum as a measure of the infrared absorption characteristics of said sample material.

9. The method of measuring the infrared absorption characteristics of a sample material which comprises forming at least two substantially similar beams of infrared energy; passing at least one of said beams through said sample; combining at least one of said beams passed through said sample with at least one of the remaining beams not passed through said sample; effecting a first deviation of the wavelengths of the combined beam of infrared energy; impinging at least a portion of the deviated radiation wavelengths onto the surface of a diffraction grating having a groove width narrower than the wavelengths of some of the radiation incident thereon and longer than other wavelengths of said radiation; rotating said grating within a first region through a diffracting angle relative to some of said wavelengths; rotating said grating to a second region; rotating said grating within said second region through a specular reflecting angle relative to other of said wavelengths; effecting a second deviation of the wavelengths of the energy leaving said grating in each of said regions; and measuring the intensity of energy at each of a plurality of wavelengths throughout the infrared spectrum as a measure of the infrared absorption characteristics of said sample material.

10. Apparatus for the dispersion of radiant energy according to its component wavelengths which comprises a wavelength deviation element adapted to receive and deviate the wavelengths of a beam of said radiant energy; diffraction grating means having a groove width narrower than at least a portion of the wavelengths from said deviation element and positioned to receive and specularly reflect said wavelengths back to said deviation element to effect a second deviation thereof.

11. The apparatus of claim 10 wherein said deviation element is a prism.

12. The apparatus of claim 10 wherein said radiant energy is infrared energy.

13. Apparatus for dispersing radiant energy according to its component wavelengths comprising wavelength deviation means positioned to receive radiant energy, diffraction grating means located adjacent said deviation means, said diffraction grating means being pivotally mounted, means to rotate said grating through a first region whereby certain of the component wavelengths of radiant energy from said deviation means are dispersed, means to rotate said grating through a second region whereby certain of said component wavelengths of radiant energy from said deviation means are specularly reflected; and means to rotate said grating from said first region to said second region.

14. Apparatus for the dispersion of radiant energy according to its component wavelengths which comprises wavelength separation means positioned to receive and separate the wavelengths of said radiant energy; diffraction grating means positioned to receive and disperse the radiation from said first wavelength separation means, said diffraction grating means having a groove width shorter than at least a portion of the wavelengths incident thereon; and means for rotating the surface of said diffraction grating through an angle to place said grating surface approximately normal to said radiation whereby said grating acts as a mirror relative to those wavelengths longer than its groove width.

15. Apparatus for the dispersion of radiant energy according to its component wavelengths which comprises a wavelength deviation means positioned in intercepting relationship with a beam of said radiant energy; diffraction grating means positioned in intercepting relationship with said beam of radiant energy and characterized by having a groove width narrower than at least a portion of the wavelengths incident thereon and wider than other of said wavelengths; means for rotating said diffraction grating through a specular reflecting angle relative to some of said wavelengths; and means for rotating said diffraction grating through a diffracting angle relative to other of said wavelengths.

16. Apparatus for measuring the infrared absorption characteristics of a sample material which comprises infrared energy source means; sample positioning means for supporting and containing an infrared absorbing sample; means for passing a beam of infrared energy from said source means through said sample; prism means positioned to receive the radiation from said sample and deviate said radiation in accordance with the various wavelength components thereof; diffraction grating means having a groove width narrower than at least a portion of the wavelengths from said prism means and positioned to receive the radiation from said prism means; means for rotating the surface of said diffraction grating through a relatively small angle with the radiation from said prism means to selectively diffract those wavelengths no greater than twice the groove width and return them to said prism means; means for rotating the surface of said diffraction grating through an angle to place said grating surface approximately normal to said radiation whereby said diffraction grating acts as a mirror relative to those wavelengths longer than its groove width to reflect said wavelengths to said prism means; means for measuring the intensity of energy at each of a plurality of wavelengths throughout the radiation spectrum from said prism means as a measure of said infrared absorption characteristics of said sample material.

17. Apparatus for measuring the infrared absorption characteristics of a sample material which comprises infrared energy source means; means for providing a sample beam and a reference beam of said infrared energy; sample positioning means for supporting and containing an infrared absorbing sample; means for passing said sample beam through said sample; means for combining said sample beam after its passage through said sample with said reference beam; prism means positioned to receive the combined beam and deviate said radiation in accordance with the various wavelength components thereof; diffraction grating means having a groove width narrower than at least a portion of the wavelengths from said prism means and positioned to receive the radiation from said prism means; means for rotating the surface of said diffraction grating through a relatively small angle with the radiation from said prism means to selectively diffract wavelengths up to twice the groove width and return them to said prism means; means for rotating the surface of said diffraction grating through a major angle to place said grating surface approximately normal to said radiation whereby said diffraction grating acts as a mirror relative to wavelengths longer than its groove width to reflect said wavelengths to said prism means; means for measuring the intensity of energy at each of a plurality of wavelengths throughout the radiation spectrum from said prism means as a measure of said infrared absorption characteristics of said sample material.

18. The apparatus of claim 17 wherein said prism is a sodium chloride prism.

References Cited in the file of this patent

UNITED STATES PATENTS

| | | |
|---|---|---|
| 2,757,568 | Fastie | Aug. 7, 1956 |
| 2,856,531 | Brouwer | Oct. 14, 1958 |
| 2,879,393 | Cary et al. | Mar. 24, 1959 |
| 2,924,715 | Hendee et al. | Feb. 9, 1960 |
| 2,945,953 | Martin | July 19, 1960 |
| 2,950,391 | Brumley et al. | Aug. 23, 1960 |